(12) United States Patent
Rasmussen et al.

(10) Patent No.: US 8,769,804 B2
(45) Date of Patent: Jul. 8, 2014

(54) METHOD OF ASSEMBLING AN ELECTRIC MOTOR

(75) Inventors: Roy D. Rasmussen, Janesville, WI (US);
Aaron M. Finke, Janesville, WI (US);
Nathan D. Lewis, Oregon, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 150 days.

(21) Appl. No.: 13/397,080

(22) Filed: Feb. 15, 2012

(65) Prior Publication Data

US 2013/0205581 A1    Aug. 15, 2013

(51) Int. Cl.
*H02K 15/00* (2006.01)

(52) U.S. Cl.
USPC ............... 29/596; 29/592.1; 310/91

(58) Field of Classification Search
USPC ................... 29/592.1, 596; 310/91
See application file for complete search history.

(56) References Cited

U.S. PATENT DOCUMENTS

| | | | | | |
|---|---|---|---|---|---|
| 3,705,994 | A | * | 12/1972 | Berry, Jr. | 310/91 |
| 3,857,170 | A | * | 12/1974 | Stoner | 29/596 |
| 3,974,873 | A | * | 8/1976 | Stoner | 29/596 |
| 4,087,903 | A | * | 5/1978 | Stoner | 29/596 |
| 4,480,378 | A | * | 11/1984 | White et al. | 29/732 |
| 4,549,346 | A | * | 10/1985 | White | 29/736 |
| 4,557,041 | A | * | 12/1985 | White et al. | 29/732 |

* cited by examiner

*Primary Examiner* — Carl Arbes
(74) *Attorney, Agent, or Firm* — Cantor Colburn LLP

(57) ABSTRACT

A method of assembling an electric motor is provided. The method includes positioning a guide rod within a motor housing and along an axial direction of the motor housing, wherein the guide rod is disposed radially inward of a plurality of motor components. Also included is guiding a rotor along the guide rod and radially inward of the plurality of motor components.

19 Claims, 3 Drawing Sheets

METHOD OF ASSEMBLING AN ELECTRIC MOTOR

BACKGROUND OF THE INVENTION

The present invention relates to electric motors, and more particularly to methods of assembling such electric motors.

A common type of electric motor is a permanent magnet motor that includes highly magnetized components. One such highly magnetized component may be a rotor. The strong magnetic attraction between various components poses difficulties associated with assembly of such an electric motor. During installation of the rotor, for example, an inability to adequately control the magnetic attraction between the rotor and various fragile components of the electric motor may result in undesirable damage to the fragile components. To compound this problem, assembly of the electric motor is often conducted in a "blind" manner. This is the case when certain components must be installed prior to installation of the magnetized rotor. In such an assembly, components such as O-rings or an end housing are installed prior to the rotor, thereby exposing sensitive components, such as bearings and sleeves. In the "blind" assembly, subtle damage to motor components may not be detected until the electric motor is completely assembled and the issue does not manifest until early failure, for example.

BRIEF DESCRIPTION OF THE INVENTION

According to one embodiment, a method of assembling an electric motor is provided. The method includes positioning a guide rod within a motor housing and along an axial direction of the motor housing, wherein the guide rod is disposed radially inward of a plurality of motor components. Also included is guiding a rotor along the guide rod and radially inward of the plurality of motor components.

According to another embodiment, a method of assembling an electric motor is provided. The method includes positioning a plurality of motor components proximate a guide rod, wherein the plurality of motor components are disposed within a motor housing, wherein the guide rod extends along an axial direction of the motor housing. Also included is guiding a rotor along the guide rod into the motor housing. Further included is operably coupling a rotating component to a rotor shaft.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
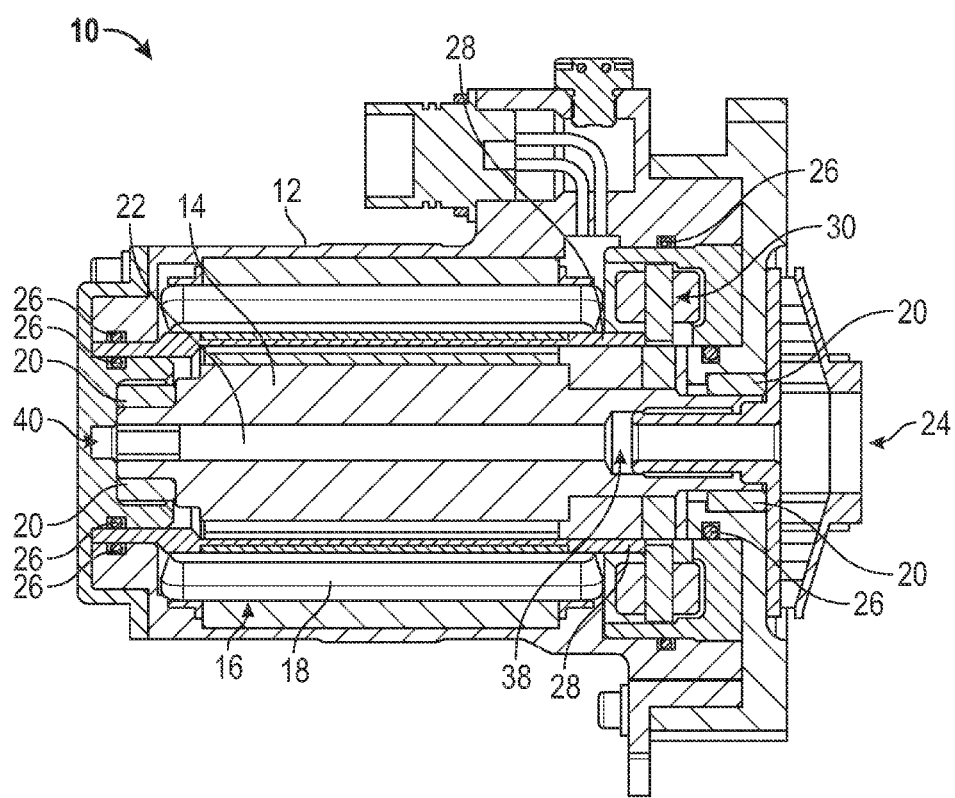
FIG. 1 is a cross-sectional view of an electric motor.

Referring to FIG. 1, an electric motor is generally illustrated with reference numeral 10. The specific configuration of the electric motor 10 does not affect the applicability of the embodiments described herein, but for illustrative purposes, the electric motor 10 may be configured as a permanent magnet motor, for example. The electric motor 10 is disposed within, and substantially enclosed by, a motor housing 12. The motor housing 12 operably supports and/or houses various components associated with the electric motor 10. The electric motor 10 generally includes a rotor 14, a stator core 16, at least one stator winding 18 and a plurality of rotor bearings 20, such as carbon journal bearings.

The rotor 14 rotates a rotor shaft 22 and optionally a rotating component, such as an impeller 24, fitted thereon and it is to be appreciated that rotation of the rotor shaft 22 may be used to control any desired device. A plurality of seal components, such as O-rings 26, are disposed within the electric motor 10 to provide protection from ingress of debris and undesirable substances into the stator core 16, among other functional advantages. It is contemplated that the O-rings 26 may form a double O-ring seal. Other sealing components may include sleeves 28, such as a stator sleeve. The electric motor 10 also includes a resolver 30 that provides a position determining function.

Figure 2:
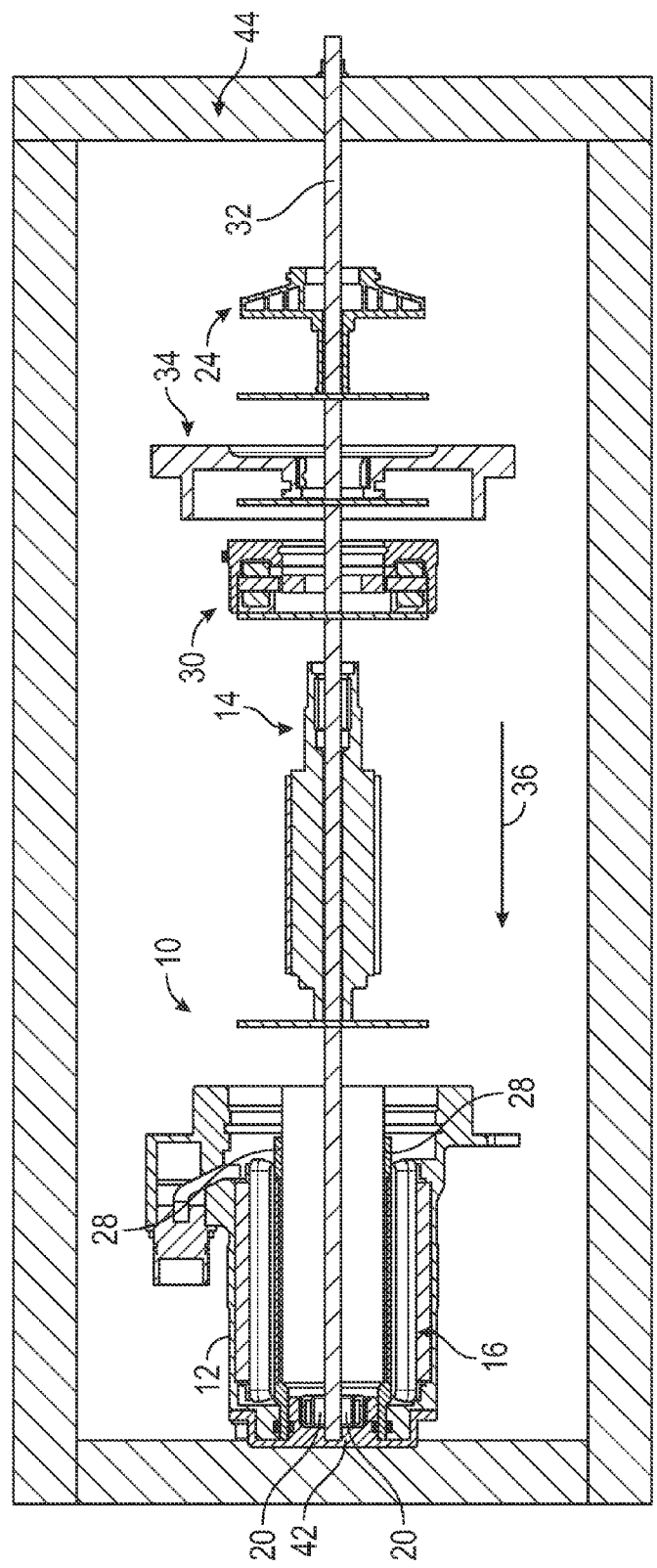
FIG. 2 is an exploded, cross-sectional view of the electric motor illustrating a method of assembling the electric motor.
Figure 3:
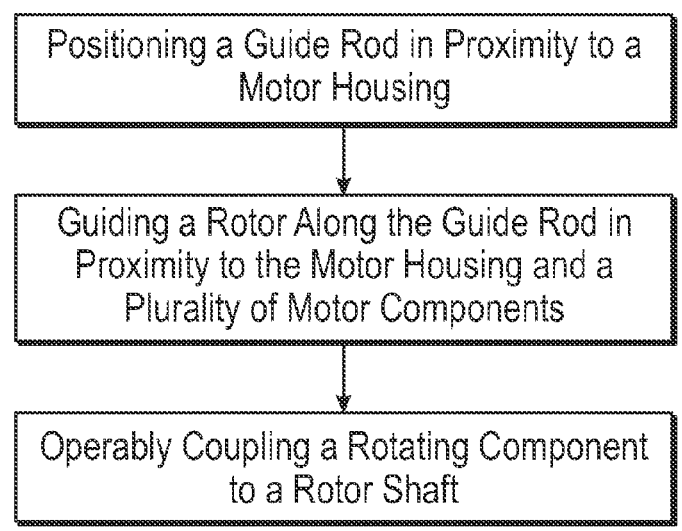
FIG. 3 is a flow diagram illustrating the method of assembling the electric motor.

Referring to FIGS. 2 and 3, a method of assembling the electric motor 10 is illustrated. The electric motor 10 has been previously described and specific components need not be described in further detail. The major components of the electric motor 10 are configured to be assembled in a coaxial manner with a guide rod 32. The guide rod 32 is positioned centrally in the motor housing 12, with various motor components containing apertures or bores to accept the guide rod 32 at a radially inward location of each component. Such components that are configured to receive the guide rod 32 include the rotor 14, the sleeve(s) 28 of the stator core 16, the resolver 30 and a center housing 34, for example. The described components configured to receive the guide rod 32 are merely illustrative, and it is to be appreciated that alternative or additional components may be configured to directly or indirectly receive the guide rod 32. Other components are installed either prior to or subsequent to positioning of the guide rod 32.

In one embodiment, the method includes positioning the rotor 14 in communication with the guide rod 32, such that guiding of the rotor 14 along the guide rod 32 is achieved. The rotor 14 is guided along the guide rod 32 in a relatively axial direction 36 of the electric motor 10. The rotor 14 may first be guided into and through the sleeve(s) 28 of the stator core 16, as well as through delicate bearings 20, such as carbon journal bearings. Once the rotor 14 has reached an adequate depth, the resolver 30 is guided along the guide rod 32 and over a portion the rotor 14. The center housing 34 that contains additional bearings 20, such as the carbon journal bearings described above, is then guided along the guide rod 32 into communication with the motor housing 12 of the electric motor 10. It is to be understood that the sequence of operations described above is exemplary and is not limiting of alternative sequences that provide adequate assembly of the electric motor 10.

Consistent with and in addition to the embodiment described above, the rotating component, such as an impeller 24, is installed. The impeller 24 may also be configured to guide along the guide rod 32 and into operable connection with a first end 38 of the rotor shaft 22 (shown in FIG. 1). The operable connection may include a threaded connection between the impeller 24 and the rotor shaft 22, but alternative mechanical connections are contemplated. Torqueing of the impeller 24 to the rotor shaft 22 may be achieved in a number of manners, however, the guide rod 32 facilitates efficient and reliable torqueing of the impeller 24 to the rotor shaft 22. To employ the guide rod 32, a second end 40 of the rotor shaft 22 is operably coupled to the guide rod 32. The operable coupling of the rotor shaft 22 to the guide rod 32 may be achieved by various mechanical attachments, such as threading or a mating fit of engageable geometric cross-sections. The geometric configuration of the mating fit may be hexagonal, for example. By operably connecting the rotor shaft 22 that is to be torqued to the impeller 24, the rotor shaft 22 is fixedly secured, such that rotation of the rotor shaft 22 is reduced or eliminated during torqueing of the impeller 24 to the rotor shaft 22. This is based on the fixed securement of the guide rod 32 to at least one portion of the electric motor 10, such as an end cap 42 of the motor housing 12. The end cap 42 includes a machined bore, for example, to provide secure fixing of the guide rod 32. Alternatively, the guide rod 32 may be fixed at one or both ends to a fixture 44 that is configured to provide secure fixing of the guide rod 32.

Upon adequate torqueing of the impeller 24 to the rotor shaft 22, the guide rod 32 is disengaged from the rotor shaft 22 at the second end 40 of the rotor shaft 22 and removed from the electric motor 10 by extracting the guide rod 32 through the machined bore of the end cap 42. Removal of the guide rod 32 at this point is appropriate, based on the secure positioning of the rotor 14 within the motor housing 12, and more specifically within the bearings 20, such as the carbon journal bearings.

Accordingly, assembly of the electric motor 10 is simplified and reliably controlled, based on the use of the guide rod 32 to install various components of the electric motor 10. The assembly method is particularly beneficial for electric motors comprising magnetic components, such as the rotor 14, due to the potential for damaging of sensitive components during assembly without a feature such as the guide rod 32. Additionally, a reliable and effective torqueing of the rotating component, such as the impeller 24, to the rotor shaft 22 is provided by the assembly method employing the guide rod 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of assembling an electric motor comprising:
   positioning a guide rod within a motor housing and along an axial direction of the motor housing, wherein the guide rod is disposed radially inward of a plurality of motor components; and
   guiding a rotor along the guide rod and radially inward of the plurality of motor components, wherein guiding the rotor comprises disposing the guide rod through a central portion of the rotor for sliding the rotor thereon.

2. The method of claim 1, further comprising securing the guide rod proximate an end cap of the motor housing.

3. The method of claim 1, wherein the plurality of motor components comprises at least one of a bearing, a stator sleeve and a resolver.

4. The method of claim 3, further comprising engaging a first end of a rotor shaft to a rotating component, wherein at least a portion of the rotating component is disposed external to the motor housing.

5. The method of claim 4, wherein the rotating component is an impeller.

6. The method of claim 4, further comprising engaging a second end of the rotor shaft to the guide rod.

7. The method of claim 6, further comprising torqueing the rotating component to the rotor shaft via a threaded connection between the rotor shaft and the rotating component.

8. The method of claim 1, further comprising positioning the guide rod relatively within at least one of a bore of the motor housing and an external fixture disposed proximate the motor housing.

9. The method of claim 6, further comprising disengaging the guide rod from the second end of the rotor shaft and removing the guide rod from the motor housing.

10. A method of assembling an electric motor comprising:
    positioning a plurality of motor components proximate a guide rod, wherein the plurality of motor components are disposed within a motor housing, wherein the guide rod extends along an axial direction of the motor housing;
    guiding a rotor along the guide rod into the motor housing, wherein guiding the rotor comprises disposing the guide rod through a central portion of the rotor for sliding the rotor thereon; and
    operably coupling a rotating component to a rotor shaft.

11. The method of claim 10, wherein the guide rod is disposed radially inward of the plurality of motor components.

12. The method of claim 10, further comprising securing the guide rod within an end cap of the motor housing.

13. The method of claim 10, further comprising positioning the guide rod relatively within at least one of a bore of the motor housing and an external fixture disposed proximate the motor housing.

14. The method of claim 10, wherein the plurality of motor components comprises at least one of a bearing, a stator sleeve and a resolver.

15. The method of claim 10, wherein at least a portion of the rotating component is disposed external to the motor housing.

16. The method of claim 15, wherein the rotating component is an impeller.

17. The method of claim 15, wherein operably coupling the rotating component to the rotor shaft comprises:
    engaging a first end of the rotor shaft with the rotating component;
    engaging a second end of the rotor shaft with the guide rod; and
    torqueing the rotating component to the rotor shaft via a threaded connection between the rotor shaft and the rotating component.

18. The method of claim 17, wherein the second end of the rotor shaft comprises a hexagonal portion configured to engage the guide rod.

19. The method of claim 17, further comprising disengaging the guide rod from the second end of the rotor shaft and removing the guide rod from the motor housing.

* * * * *